(12) United States Patent
Meyer et al.

(10) Patent No.: US 7,651,771 B2
(45) Date of Patent: Jan. 26, 2010

(54) LUMINESCENT CORE/SHELL NANOPARTICLES COMPRISING A LUMINESCENT CORE AND METHOD OF MAKING THEREOF

(75) Inventors: Christiane Meyer, Hamburg (DE); Markus Haase, Hamburg (DE)

(73) Assignee: Centrum fur Angewandte Nanotechnologie (CAN) GmbH, Hamburg (DE)

( * ) Notice: Subject to any disclaimer, the term of this patent is extended or adjusted under 35 U.S.C. 154(b) by 395 days.

(21) Appl. No.: 10/554,896

(22) PCT Filed: Apr. 29, 2004

(86) PCT No.: PCT/EP2004/004573

§ 371 (c)(1),
(2), (4) Date: Nov. 1, 2006

(87) PCT Pub. No.: WO2004/096943

PCT Pub. Date: Nov. 11, 2004

(65) Prior Publication Data
US 2007/0054120 A1    Mar. 8, 2007

(30) Foreign Application Priority Data
Apr. 30, 2003  (EP) .............................. 003009705

(51) Int. Cl.
*B32B 5/16* (2006.01)
(52) U.S. Cl. .................... 428/403; 977/773; 977/834; 977/890; 977/896; 977/900

(58) Field of Classification Search ................. 428/403; 977/773, 834, 890, 896, 900
See application file for complete search history.

(56) References Cited

U.S. PATENT DOCUMENTS

| 5,985,173 | A | 11/1999 | Gray et al. |
| 6,207,229 | B1 | 3/2001 | Bawendi et al. |
| 6,815,064 | B2 * | 11/2004 | Treadway et al. ........... 428/403 |
| 6,833,086 | B2 * | 12/2004 | Kajiwara .............. 252/301.6 S |
| 2001/0024088 | A1 | 9/2001 | Justel et al. |
| 2003/0017264 | A1 | 1/2003 | Treadway et al. |

(Continued)

FOREIGN PATENT DOCUMENTS

DE        101 31 173 A1    6/2001

(Continued)

OTHER PUBLICATIONS

Farmer, et al., "Photoluminescent Polymer/Quantum Dot Composite Nanoparticles" (XP-001108765), *Chem. Mater. 2001*, 13, pp. 3920-3926; and.

(Continued)

*Primary Examiner*—H. (Holly) T Le
(74) *Attorney, Agent, or Firm*—Scully, Scott, Murphy & Presser, P.C.

(57) ABSTRACT

The present invention relates to Luminescent nanoparticles comprising (a) a core made from a luminescent metal salt selected from phosphates, sulfates or fluorides, being surrounded by (b) a shell made from a metal salt or oxide capable of preventing or reducing energy transfer from the core after its electronic excitation to the surface of the nanoparticle, e.g. a shell made from a non-luminescent metal salt or oxide, which are characterized by higher quantum yields and can be used in various fields including light generation and security marking.

25 Claims, 2 Drawing Sheets

U.S. PATENT DOCUMENTS

2003/0032192 A1    2/2003    Haubold et al.

FOREIGN PATENT DOCUMENTS

| EP | 0333053 | A2 | | 9/1989 |
|---|---|---|---|---|
| EP | 1 076 084 | A2 | | 4/1994 |
| JP | 01-318078 | | * | 12/1989 |
| JP | 01318078 | A | | 12/1989 |
| JP | 05251008 | A | | 9/1993 |
| JP | 11043669 | A | | 2/1999 |
| WO | WO 00/38282 | | | 6/2000 |

OTHER PUBLICATIONS

Haase, et al., "Synthesis and Properties of Colloidal Lanthanide-Doped Nanocrystals", Journal of *Alloys and Compounds*, 303-304 (2000), pp. 191-197.

Markovsky, L.Y., et al., Luminophores, 1966, pp. 10-12.

* cited by examiner

LUMINESCENT CORE/SHELL NANOPARTICLES COMPRISING A LUMINESCENT CORE AND METHOD OF MAKING THEREOF

The present application relates to lumininescent, in particular photoluminescent nanoparticles having a core of a luminescent material being surrounded by a specific shell and their synthesis.

BACKGROUND OF THE PRESENT APPLICATION

Over the last decade, nanoparticles, i.e. particles having sizes below 1 micrometer, have attracted a great deal of interest in research and industry due to their unique properties. Research and development in the optoelectronic area have focused on luminescent particles in view of their possible application in light emitting diodes (LED), displays, optoelectronic devices in nanometer dimensions or as a light source in low threshold lasers.

Among luminescent materials, a distinction is often made between semiconductor and non semiconductor materials.

Semiconductor nanoparticles, such as II-VI or III-V semiconductors which may be doped or not, are characterized by a quantum confinement of both the electron and hole in all three dimensions which leads to an increase in the effective band gap of the material with decreasing crystalline size. Consequently, it is possible to shift both the optical absorption and emission of semiconductor nanoparticles to the blue (higher energies) as the size of the nanoparticles gets smaller. However, the size dependency of the emission is undesired for many applications since it requires a very strict control of the particle size distribution or size selection steps before industrial applications can be envisaged.

Water-soluble core/shell semiconductor nanocrystals are, for instance, described in WO 00/17655.

In contrast thereto, it constitutes the particular attractivity of nanocrystalline non-semiconductor-based luminescent materials, in particular, lanthanide-doped metal oxides or salts, that their fluorescent emission is relatively narrow and does not depend to a greater extent on the host material and the size of the nanoparticles. It is rather only the type of lanthanide metal which determines the emission color. PCT/DE 01/03433 assigned to the same applicants discloses a generally applicable synthesis method for lanthanide-doped nanoparticles of this type. These nanoparticles can be produced in sizes (below 30 nm) no longer interacting with the wavelength of visible light, thereby leading to transparent dispersions e.g. in organic or aqueous solvents.

One important parameter governing the usefulness of lanthanide-doped nanoparticles is their quantum yield. As quantum yield, we understand the ratio of photons emitted to that absorbed.

As a rule, it is desired to reach with nanocrystalline materials quantum yields in the same order as for the corresponding macrocrystalline luminescent material. The commercially available macrocrystalline green luminescing phosphor $(La_{0.45}, Ce_{0.40})PO_4:Tb_{0.15}$ shows for instance total quantum yields in the order of 93% (including the UV emission).

However, due to the much higher surface/volume ratio of nanocrystalline materials, the likelihood of surface luminescence quenching phenomena increases.

K. Riwotzki et al., J. Phys. Chem. B 2000, 104, 2824-2828, "Liquid phase synthesis doped nanoparticles: colloids of luminescent $LaPO_4$:Eu and $CePO_4$:Tb particles with a narrow particle size distribution", report for instance quantum yields of less than 10% for $LaPO_4$:Eu upon excitation at 277 nm and $CePO_4$:Tb quantum yields of 16%, if the emission of cerium is included, and 11% if the emission of terbium is considered only. The observed values are far removed from the theoretical quantum yields of 89% and 38% calculated for nanocrystalline $LaPO_4$:Eu and $CePO_4$:Tb, respectively. The authors of this article assume that the excited state of the host is depleted by energy transfer not only to the luminescent centers but also to centers where radiationless recombination occurs. Likely centers for the radiationless combination may be the same quencher ions to which energy from the luminescing ions is transferred or may be surface states of the nanoparticles. In this context the authors mention that growing a shell of inert material around each nanoparticle has already been successfully applied to semiconductor nanoparticles thereby increasing their luminescence quantum yields to values between 30% and more than 60% (references 37-44 of K. Riwotzki et al).

Jan W. Stouwdam and Frank C. J. M. van Veggel, Nano Letters, ASAP article, web release May 15, 2002, "Near-infrared emission of redispersible $Er^{3+}$, $Nd^{3+}$ and $Ho^{3+}$ doped $LaF_3$ nanoparticles" discloses the preparation of nanoparticles which may be promising materials for polymer-based optical components, because they show luminescence and wavelengths between 1300 and 1600 nm where silicon-based optical fibres have their maximum transparency. The authors measured a bi-exponential decay for the luminescence of these nanoparticles and speculate in this context that a way to improve the luminescence of ions located at or near the surface might be to grow a layer of undoped $LaF_3$ around the particles.

K. Riwotzki et al., J. Phys. Chem. B 2001, 105, 12709-12713, "Colloidal $YVO_4$:Eu and $YP_{0.95}V_{0.05}O_4$:Eu particles: Luminescence and Energy transfer process" discuss a $YPO_4$ coating for $YVO_4$:Eu cores as conceivable means to improve the low quantum yield of 15% observed for nanocrystalline YVO4:Eu.

The synthesis of core/shell particles, however, encounters major obstacles. Firstly, an independent growth of the starting materials used for the shell is to be prevented since the same would lead to co-existing homogenous nanoparticles of different composition. Simultaneously, exchange processes between the individual nanoparticles and Oswald ripening have to be suppressed. Oswald ripening is a phenomenon occurring in dispersions of small particles at higher temperatures and involving the growth of bigger particles at the expense of smaller particles. This mechanism also leads to the randomisation of the different compositions used for core and shell.

M. Haase et al, Journal of Alloys and Compounds, 303-304 (2000) 191-197, "Synthesis and properties of colloidal lanthanide-doped nanocrystals" compare the properties of lanthanide-doped nanocrystals that were prepared hydrothermally (in aqueous solution) and in high-boiling organic solvents (tributylphosphat), respectively. The authors report a luminescence quantum yield of 15% at room temperature for $YVO_4$:Eu nanoparticles.

Luminescence quantum yields in the same order (15%) are also mentioned in G. A. Hebbink et al, Advanced Materials 2002, 14, No. 16, pages 1147-1150, "Lanthanide(III)-doped nanoparticles that emit in the near-infrared", for $Nd^{3+}$ and $Er^{3+}$-doped $LaPO_4$ particles.

Therefore, up to date, non-semiconductor core/shell particles have not yet been synthesized.

Accordingly, it is an object of the present application to provide a synthesis for specific non-semiconductor core/shell particles.

Further, the present application aims at increasing the quantum yield of homogenous luminescent non-semiconductor particles.

SUMMARY OF THE PRESENT INVENTION

The above technical objects have been solved by:

luminescent nanoparticles comprising (a) a core made from an optionally doped, luminescent metal salt selected from phosphates, sulfates or fluorides, being surrounded by (b) a shell made from a metal salt or oxide capable of preventing or reducing energy transfer from the core after its electronic excitation to the surface of the nanoparticle, as well as a process for the preparation of these nanoparticles, said process comprising the steps of preparing a first mixture comprising doped luminescent metal sulfate, phosphate or fluoride nanoparticles in an organic medium, reacting said first mixture, an anion source for the shell to be formed and a second mixture comprising shell-forming metal ions and an organic complexing agent for said metal ions at a temperature of 50 to 350° C. until a shell has formed around said luminescent nanoparticles.

DETAILED DESCRIPTION OF THE PRESENT INVENTION

I. Lumininescent Nanoparticles

The luminescent, in particular photoluminescent particles of the present invention comprise a core made from an optionally doped, luminescent inorganic metal salt selected from phosphates, sulfates of fluorides.

"Luminescence" characterizes the property of the claimed nanoparticles to absorb energy (e.g., in the form of photons, electron rays, X-ray, etc.) which is then emitted as light of lower energy. It is to be understood that the term "luminescent" throughout the description and the claims also includes the more specific and preferred meaning "photoluminescent"

As "photoluminescence" we understand the capability of the inorganic metal salt to absorb photons of a specific energy (e.g. UV, visible) and emit light of lower energy (longer wavelength, e.g. UV, visible, IR) over a certain period of time. The period of light emission can correspond to life-times of the excited state up to $10^{-7}$ or $10^{-8}$ sec, which are typically referred to as fluorescence, but also much longer periods. For lanthanide-doped sulfates, phosphates or fluorides, typically lifetimes of the excited state in the order of milliseconds (for instance, 1-20 ms) are observed.

"Doping" is to be understood in a broad sense. The upper limit of dopant to be used should be low enough that the generated luminescence is not reduced by concentration quenching phenomena. Correspondingly, this upper limit depends on factors like the distance between the dopant metal ions in the lattice which are specific to each core material. Preferably, the host material is substituted by the dopant in an amount of up to 50 mol %, preferably 0.1 to 45 mol %, e.g. 0.5 to 40 mol %, or 1 to 20 mol %.

According to a first embodiment of the present invention, a preferably doped core material is coated by non-luminescent metal salts, in particular phosphates, sulfates or fluorides.

The host material used for the core is not specifically limited. It can be selected among known sulfates, phosphates or fluorides depending on the dopant to be incorporated into the lattice. Since most luminescent dopants are bi- or tri-valent metal ions, it is preferred to use sulfates, phosphates or fluorides of non-luminescent bi- or tri-valent metal atoms such as the metals of group 2 (earth alkaline metals, such as Mg, Ca, Sr, or Ba), or group 3 (Sc, Y or La) or group 13 (e.g. Al, Ga, In or Tl) or Zn. When selecting a suitable host material for a specific dopant, it is further to be taken into account, as known in the art, that host and dopant metal preferably should have the same valence and similar (tolerance e.g. ±20%) or identical ion diameters. Simultaneously, it typically increases the compatibility of dopant and host metal if these are capable of forming, with a specific anion, crystals of the same or similar lattice type having the same or similar lattice constant(s) (tolerance e.g. ±20%).

The above criteria can be met with Ba and Sr as host material metal for the core since these metals display ion diameters which are very similar to those of the two-valent (+II) lanthanide dopants. For the same reason, La and Y salts are suitable host materials for tri-valent (+III) lanthanide dopants.

There are also no specific restrictions regarding the type of dopant metal to be incorporated, as long as the same is capable of converting absorbed photons to luminescent radiation. Thus, for instance metals like Cr, Ag, Cu, Co or Mn (for instance, in combination with zinc as host metal) can be used. Among these, $Cr^{3+}$ and $Mn^{2+}$ are preferred dopants for host metal atoms of groups 13 and 2, respectively. Doping with lanthanide metals is however preferred since the luminescence of lanthanide metals is particularly independent from its lattice environment. Generally, the use of bi- or trivalent dopants, in particular lanthanide dopants is preferred. Bivalent lanthanides (+II oxidation state) are characterized by a relatively strong absorption, but relatively broad emission bands. For this reason, they can be suitably used as sensitizer transferring the energy to other luminescing metals (e.g. $Eu^{2+}$ to $Mn^{2+}$). The capacity of trivalent lanthanides (oxidation state +III) to emit light in the form of relatively sharp bands makes them also particularly attractive dopants for specific applications. These dopants can be used as sole dopant metal or in combination, as explained later for some combinations of trivalent lanthanides.

The doping lanthanide ion(s) can be suitably selected among Ce (element number 58), Pr (59), Nd (60), Sm (62), Eu (63), Gd (64), Tb (65), Dy (66), Ho (67), Er (68), Tm (69), or Yb (70). Preferred dopants are Ce, Nd, Eu, Tb, Dy, Ho, Er and Yb. $Er^{3+}$, $Nd^{3+}$ and $Ho^{3+}$ are of particular interest for the telecommunication area since they emit between 1300 and 1600 nm. Ce is preferably used in combination with another dopant material, such as Nd, Dy or Tb. Ce is known to absorb strongly UV radiation having a wavelength of from 250 to 300 nm and shows a fairly broad luminescence band around 330 nm, depending on the lattice environment (e.g. in a phosphate lattice). If Ce is used in combination with other dopants to which the absorbed energy can be transferred, very efficient luminescent systems can be generated. Another attractive combination of dopant metals is Yb and Er, which is of great importance in $Er^{3+}$-doped optical amplifiers where $Er^{3+}$ is pumped indirectly via $Yb^{3+}$ which has a ten times higher absorption cross section and a much broader peak at 980 nm than $Er^{3+}$.

As indicated before, it is not only possible to use these lanthanide metal combinations as dopants for the core. It is equally effective to employ as host metal that lanthanide metal ion (e.g. $Ce^{3+}$, $Yb^{3+}$) having the higher absorption cross section and replacing a part thereof by lower amounts of the other metal (e.g., 0.1 to 40 mol %, preferably 0.5 to 30 mol %). The other metal is preferably $Nd^{3+}$, $Dy^{3+}$ or $Tb^{3+}$ in the case of $Ce^{3+}$-based host materials and $Er^{3+}$ for $Yb^{3+}$-based host materials. For this reason, lanthanide sulfates, phosphates or fluorides (e.g. $Ce^{3+}$, $Yb^{3+}$) can also be used as the host material of the core. They can be combined with the same shell materials as explained below in further detail, preferably sulfates, phosphates or fluorides of metals of group 2, in particular La sulfates, phosphates or fluorides. Particularly preferred embodiments are core/shell particles of the $CePO_4$: $Tb/LaPO_4$ and $CePO_4$:$Nd/LaPO_4$ type.

According to the present invention, the shell material, i.e. a metal salt or oxide, is capable of preventing or reducing energy transfer from the core, in its electronically excited state, to the surface of the core/shell particle, where it would be quenched. It is believed that these quenching phenomena, which are observed with luminescent nanoparticle cores having no shell, are caused either by the interaction of luminescent centers at the surface with molecules from the environment (e.g. solvent) contacting or binding to the surface or by unsaturated surface states. As to the latter effect, free valencies of surface metal atoms are assumed to result in low energy states to which the energy absorbed by metal atoms located below the surface can be easily transferred.

The requirement to prevent or reduce energy transfer can be always met with metal salts or oxides wherein the energetic distance between the electronic ground state and the first electronically excited state is greater than the corresponding energetic distance of the selected core. Under these circumstances the energy (e.g. UV, visible, IR) absorbed by the core cannot be transmitted to the shell, in particular the shell metal atoms. The localization of the energy in the core achieved thereby prevents surface quenching phenomena and increases the quantum yield. According to the aforementioned first embodiment of the present invention, the shell salt or oxide is non-luminescent and thus lacking low energy electronic states to which the energy could be transferred from the excited core.

According to a second embodiment of the present invention, the core consists of a luminescent lanthanide sulfate, phosphate or fluoride and the shell consists of a lanthanide salt or oxide being different from the core material and preventing or reducing energy transfer from the core after its electronic excitation to the surface of the nanoparticle. Core and lanthanide metal atom can be suitably selected among Ce (element number 58), Pr (59), Nd (60), Sm (62), Eu (63), Gd (64), Tb (65), Dy (66), Ho (67), Er (68), Tm (69), or Yb (70) provided that, as explained above, the respective energetic distances between electronic ground state and first excited state do not allow the transfer of the excitation energy from the core to the shell. Preferably the core consists of a Nd sulfate, phosphate or fluoride and the shell consists of a Gd salt or oxide. This combination of these metal atoms is particularly attractive since the Gd shell does not only increase the quantum yield of the Nd sulfate, phosphate or fluoride, but also provides excellent NMR contrast properties which are believed to stem from the localization of Gd at the surface of the particles. The combined luminescent and NMR contrast properties make this embodiment particularly attractive for diagnostic purposes.

As regards the chemical constitution of the shell, any suitable anion or oxide can be used as long as it is capable of growing on the core particles along with the selected metal atom.

Suitable anions forming the shell involve, but are not limited to phosphates, halophosphates, arsenates, sulfates, borates, aluminates, gallates, silicates, germanates, oxides, vanadates, niobates, tantalates, tungstates, molybdates, alkalihalogenates, other halides, nitrides, sulfides, selenides, sulfoselenides oder oxysulfides. Nanoparticulate metal salts of this type are disclosed in PCT/DE 01/03433.

According to the present invention, the only criteria governing the selection of the shell metal atoms is their lacking capability to transmit luminescence energy from the excited core to the surface after irradiation. Preferred metal ions which can be used for this purpose are the same as mentioned above for the core material. They include, but are not limited to metals of group 2 (earth alkaline metals, such Mg, Ca, Sr or Ba), metals of group 3 (such Sc, Y or La), zinc, or metals of group 13 (such Al, Ga, In or Tl). In order to increase the aptitude of the shell material to grow on the surface of the core material, it is further preferred, but not absolutely necessary to select as shell material the same metal sulfate, phosphate or fluoride that constitutes the host of the core. If this requirement is not fulfilled, it is preferred that the host material of the core and the shell material belong to the same lattice type and display very similar (tolerance e.g. ±20%) or identical lattice constants.

The core/shell particles of the present invention constitute preferably crystalline materials. This can be confirmed by X-ray powder diffraction patterns.

The shape of the claimed core/shell particles can be for instance needle like, ellipsoid or spherical, the latter two options being preferred.

The claimed core/shell nanoparticles preferably have an average size measured along their longest axis of 1 to 100 nm, more preferably 1 to 50 nm. Average sizes of maximally 30 nm, maximally 20 nm, maximally 10 nm, for instance 2 to 8 nm, or 4-6 nm are even more desirable. In each case, the standard deviation is preferably less than 30%, in particular less than 10%.

The particle size and distribution can be measured according to techniques further described in the already-cited articles by K. Riwotzki et al and M. Haase et al, for instance, with transmission electromicrographs (TEM).

The average thickness of the shell preferably corresponds to at least one or two monolayers. A too great thickness of the shell, on the other hand, may adversely affect the overall photoluminescence properties of the core/shell particle. A preferred upper limit for the shell thickness is thus the diameter of the core, more preferably ⅔ of the diameter, even more preferably ½ of the diameter.

II. Synthesis of Core/Shell Nanoparticles

The above-described core/shell nanoparticles of the present invention are synthesised in a process as laid down in the claims which comprises at least the following two steps:
1. The preparation of a so-called "first mixture" comprising the optionally doped, luminescent metal sulfate, phosphate or fluoride nanoparticles (cores) in an organic medium.

2. Reacting said first mixture, an anion source for the shell to be formed, in particular a phosphate, sulfate or fluoride source, and a "second mixture" comprising shell-forming metal ions and an organic complexing agent for said metal ions at a temperature of 50 to 350° C. until a shell has formed around said luminescent nanoparticles.

II.1 First Process Step and Synthesis of Core Particles

The nanoparticles provided as core material and being present in the so-called "first mixture" can be synthesised according to processes known in the art. Generally, wet synthesis techniques are preferred over dry formation processes since the former allow a better control of the particle sizes. Furthermore, the aggregation of the formed nanoparticles can be more easily suppressed in wet synthesis techniques.

Among the known wet synthesis techniques, sol-gel processes, the hydrothermal synthesis, or the organic synthesis with complexing agents that regulate crystal growth can be used. Further, it is possible to produce specifically the fluorides in a synthesis technique described in the already mentioned article by J. W. Stouwdam and F. C. J. M. Van Veggel. Accordingly, $LaF_3$ nanoparticles and other fluorides can be prepared by heating a solution of ammonium di-n-octadecyldithiophosphate and NaF in ethanol/water. Subsequently, solutions of the corresponding metal nitrates in water are added dropwise, followed by stirring the solution two hours at 75° C. and cooling to room temperature. The disadvantage of this technique, however, is that the generated particles still display a relatively broad particle size distribution which necessitates further purification steps by centrifugation.

The "hydrothermal synthesis" of lanthanide-doped phosphates is, for instance, described in "Wet-chemical synthesis of doped colloidal nanomaterials: particles and fibres of $LaPO_4$:Eu, $LaPO_4$:Ce and $LaPO_4$:Ce,Tb" by H. Meyssamy et al, Advanced Materials (1999), Vol. 11, No. 10, pages 840 et seq. As starting materials for sulfate, phosphate or fluoride nanoparticles, preferably metal chlorides, nitrates or acetates are used. The reaction is performed in water as reaction medium in an autoclave to maintain high pressures, preferably pressures of from 10-20 bar during the reaction.

The hydrothermal synthesis results in relatively large particles which often have a needle-like shape. Further, a relatively broad distribution of particle sizes typically characterizes the product. In the above-named method by H. Meyssamy et al, the percentage of nanoparticles with diameters of less than 25 nm is, for instance, only around 20%. These can be isolated by subsequent centrifugation steps.

Further, it is possible to produce optionally doped sulfates under ambient pressure in organic media selected from polyols and sulfoxides which are believed to regulate crystal growth by metal-complexing activity. This technique will be referred to in the following as "polyol or sulfoxide synthesis".

The polyols to be used preferably have two or three hydroxy groups and can be exemplified by glycerol, ethylene glycol or polyethylene glycol, whereby preferably low molecular weight polyethylene glycol is used (preferred average number of ethylene glycol units up to 4). As sulfoxide dimethylsulfoxide (DMSO) may be used. This synthesis technique is preferably employed in the preparation of earth alkaline metal sulfates, such as magnesium, calcium, strontium or barium sulfate as doped host material.

Preferred metal atom sources are the corresponding chlorides and their hydrates. As starting material for the sulfate, preferably alkali metal sulfates, ammonium sulfates or sulfates having an organic cation are employed. The corresponding hydrogensulfates are equally suitable.

The organic cation is preferably selected from basic N-containing aliphatic, aromatic and aliphatic/aromatic substances which preferably have from 4 to 30, preferably from 4 to 20 carbon atoms. Suitable cations involve, for instance, quaternary ammonium or phosphonium wherein the four substituents can be independently selected from alkyl having preferably from 1 to 10 carbon atoms (preferably 1 to 5) or benzyl, or protonated aromatic bases, such as hydrazine, amantadine, pyridine or collidine.

Correspondingly, sulfate nanoparticles can be produced from starting materials such as tetrabutylammonium hydrogensulfate, tetramethylammonium sulfate, bis-tetrabutylammonium sulfate, or triethylammonium hydrogensulfate. Other suitable starting materials are ammonium hydrogensulfate, ammonium sulfate, alkali metal hydrogensulfates, amantadine sulfates, ethylenediammonium sulfate and hydrazinium sulfate.

For doping the sulfate host material, nitrates or halides of the corresponding dopant, in particular the corresponding metal chloride can be used.

If hydrogensulfates are contained in the starting material, organic bases such as imidazol are preferably added as acid scavenger to the reaction medium. The reaction is preferably conducted at temperatures of from 50 to 240° C., whereby the lower temperature range of from 50 to 100° C. is preferred for glycerol and higher temperatures in the range from 160 to 240° C., in particular 160 to 180° C. are most suitable for the other polyol or sulfoxide solvents. The particles obtained have an average diameter in the order of 0.2 to 50 nm and are readily dispersible in aqueous media.

Nanoparticle cores obtained by sol-gel processes, the hydrothermal synthesis or the so-called "polyol or sulfoxide synthesis" are sometimes not dispersible in the organic medium to be used in the first step of the claimed method, especially if the reaction medium for the core and the method of the invention (shell synthesis), respectively, differ considerably in terms of polarity. For this reason, it may become necessary to subject the nanoparticles to an after-treatment with a suitable polar organic compound, in order to increase their dispersibility. Preferably, this after-treatment is carried out with the same organic medium which will be used in the shell synthesis or organic media of similar polarity.

If for instance the shell synthesis is to be carried out in N- or P-containing media, the after-treatment can suitably involve subjecting particles obtained in sol-gel processes, the hydrothermal synthesis or the so-called "polyol or sulfoxide synthesis" to an after-treatment with N- or P-containing media.

This after-treatment involves heating the nanoparticles in the corresponding organic compound. It has the effect that water, or other hydrophilic residues bonded at the surface of the nanoparticle are replaced by the polar organic compound. For the reasons given above, the polar organic compound is preferably selected from N- or P-containing complexing agents for metal ions as will be described further below in the context of the "organic synthesis" and the second process step. However, other functionalised polar organic compounds may also be used.

This after-treatment is not required for sulfates, as produced in the "polyol or sulfoxide" synthesis, if the subsequent manufacture steps are carried out in polyols and/or sulfoxides.

According to a further and preferred technique, hereinafter referred to as "organic synthesis", the process for the preparation of the luminescent nanoparticle cores comprises the steps of:

a) reacting, in an organic reaction medium comprising at least one metal complexing agent, and optionally at least one further solvent, a reaction medium-soluble or -dispersible metal source and a reaction medium-soluble or -dispersible phosphate, sulfate or fluoride source, b) optionally removing the reaction medium from the nanoparticulate metal phosphate, sulfate or fluoride formed thereby, and c) optionally recovering the nanoparticulate salt.

As "organic medium" we understand organic solvents which, apart from unavoidable traces, do not contain water. The boiling point of this organic medium is preferably higher than the reaction temperatures given below. It is e.g. from 150 to 400° C., preferably above 180° C., in particular above 210° C. (at ambient pressure).

Depending on the susceptibility of the metal source to oxidation, it is preferred to conduct the reaction under inert gas such as nitrogen or argon.

Regarding the degree of purity of starting materials, it is recommendable to use metal salts having a purity of at least 99.9%. All reactants and the solvents used are preferably water-free and/or are dried prior to use. However, metal chlorides which are frequently employed as hydrates should preferably not be subjected to a longer drying procedure since this may enhance the formation of reaction medium-insoluble oxychlorides.

The reaction is preferably conducted at a temperature of 50 to 350° C., e.g. 120° to 320° C., in particular 180° to 290° C. A suitable temperature can be easily determined by a skilled person by monitoring the reaction of the reactants at gradually increasing temperatures thereby determining the synthesis minimum temperature at which the reaction proceeds with sufficient speed. For this purpose the nanoparticles may, for instance, be precipitated from samples of the reaction medium which allows studying the particle growth with increasing reaction time.

Suitable reaction times can be determined in the same manner and preferably range from 10 min to 48 hours, in particular 30 min to 20 hours.

After completion of the reaction, the reaction mixture can be cooled down to room temperature. If the nanoparticles have not yet fully precipitated during the reaction or after cooling, it is possible to add methanol to the reaction medium or vice versa in order to obtain maximum yields.

Without being bound to theory, it is believed that the metal complexing agent used in the "organic synthesis" coordinates with surface metal atoms of the nanoparticles formed and thereby terminates their growth after the starting materials have reacted. It is believed that this metal complexing agent remains bound to the particle surface and in this manner prevents or reduces agglomeration and exchange processes between the particles like Oswald ripening. The organic synthesis thus leads to fairly small particles wherein the average diameter measured at the longest axis is preferably 1-10 nm, in particular 2-8 nm, for instance 4-6 nm with narrow size distributions (standard deviation <30%, in particular <10%). The metal complexing agent is characterized by the presence of a polar group capable of coordinating the metal ion and at least one second molecule portion (less polar, preferably hydrophobic), for instance an aliphatic, aromatic/aliphatic, or purely aromatic molecule portion having preferably 4 to 20, in particular 6 to 14 carbon atoms.

The metal complexing agent is preferably a phosphororganic compound or a mono-or di-substituted amine.

Among the latter, the most preferred embodiments are mono- or dialkyl amines wherein the alkyl residue preferably has from 4 to 20, in particular 6 to 14 carbon atoms, such as dodecyl amine or bis(ethylhexyl)amine.

As regards the phosphororganic compounds, it is preferred to use at least one of the following substances:

a) esters of phosphinic acid b) diesters of phosphonic acid c) triesters of phosphoric acid, most preferably trialkyl phosphates such as tributylphosphate or tris(ethylhexyl)phosphate, d) trialkyl phosphines, such as trioctylphosphine (TOP), or e) trialkyl phosphines oxides, such as trioctylphosphine oxide (TOPO)

wherein $R^1$, $R^2$ and $R^3$ are independently selected from branched or linear aliphatic (preferably alkyl), aliphatic/aromatic or aromatic residues having from 4 to 20, more preferably from 4 to 14, in particular from 4 to 10 carbon atoms. Aromatic residues can be exemplified by phenyl and aliphatic/aromatic residues by tolyl, xylyl or benzyl.

The use of phosphororganic compounds (a) to (c) and (e), in particular (a) to (c) is particularly preferred.

The metal complexing agent can be the only solvent in the organic reaction medium. It is preferably used in an amount of at least 10 mol based on the molar amount of the metal atom(s) used as metal source, if it represents the only solvent. A preferred upper limit is approximately 1000 mol.

Depending on the choice of the metal complexing agent and, in particular, the length of the hydrophobic molecule portion, the use of larger amounts may be inconvenient as it can hamper a complete precipitation of the nanoparticles formed.

Therefore, it is preferred to use additionally "at least one further solvent". In this embodiment, the metal complexing agent ("first solvent") is preferably used in a molar amount of less than 10 mol, more preferably 0.9 to 6 mol, based on one mol of the metal ions (as used as metal source). The amount of the "further solvent(s)" is preferably from 5 to 100 mol, based on one mol of metal atoms (as used as metal source).

The "further solvent(s)" should be miscible with the metal complexing agent and have a boiling point above the synthesis minimum temperature, preferably a boiling point above 150° C., more preferably above 180° C., most preferably above 210° C. Boiling points above 400° C. can be undesired.

The "further solvent(s)" can be hydrocarbon-based or have at least one polar group. The use of the latter is preferred, if water of crystallization is present in the metal salt starting materials and said water is to be replaced by a solvent which is capable of coordinating to the metal. The "further solvent(s)" is (are) preferably selected from solvents having at least one ether functionality; in particular, dialkylethers having from 5 to 10 carbon atoms per alkyl group, such as dipentyl ether, dihexyl ether, diheptyl ether, dioctyl ether, or diisoamyl ether; diaryl ether or diaralkyl ether, having in total from 12 to 18 carbon atoms, such as diphenyl ether or dibenzylether; or mono- or polyethyleneglycol (PEG) dialkylether (wherein each alkyl preferably has from 1 to 4 carbon atoms and the average number of PEG units preferably is up to 10), such as diethyleneglycol dibutyl ether, triethyleneglycol dibutyl ether, and/or tetraethyleneglycol dimethylether;

branched or unbranched alkanes which preferably have from 10 to 18 carbon atoms, in particular 12 to 16 carbon atoms, such as dodecane or hexadecane; and/or an organic high boiling base, preferably N-containing aliphatic base, most preferably a tri-substituted amine, in particular trialkylamine compounds having from 5 to 10 carbon atoms per alkyl group, such as trioctylamine or tris(2-ethylhexyl)amine or a N-containing aromatic base having preferably from 3 to 20 carbon atoms, such as imidazol.

These solvents may also be used in combination. The organic high-boiling base may not only serve as solvent, but can also function as acid scavenger. For instance if an acid, such as phosphoric acid is employed as an ion source, then it is preferred to use the base in an approximately equimolar amount (e.g. about 0.6 to 1.4 mol) with respect to the hydrogen(s) atom(s) of the acid.

The "cation source" can be selected from any suitable (sufficiently reactive) metal salt and is preferably a metal chloride, metal alkoxide (wherein the alkoxide preferably has from 1 to 6 carbon atoms, in particular from 1 to 4 carbon atoms), a metal nitrate or metal acetate. The use of metal chlorides is particularly preferred. Hydrated metal salts may also be used. However, it is preferred to remove the crystallization water before the reaction.

The "anion source" is preferably selected from
a. sulfuric acid, phosphoric acid or HF
b. phosphate, sulfate or fluoride salts that are soluble or at least dispersible in the synthesis mixture, in particular salts having an organic cation or alkali metal salts.

As to option b, the cation is preferably selected from basic N-containing aliphatic, aromatic and aliphatic/aromatic substances which preferably have from 4 to 30, preferably from 4 to 20 carbon atoms. Suitable cations involve, for instance, quaternary ammonium or phosphonium as described above or protonated aromatic bases, such as pyridine or collidine. For the preparation of phosphate nanoparticles, tetrabutylammonium dihydrogenphosphate, tetramethylammonium dihydrogenphosphate, or triethylammonium dihydrogenphosphate may be used as anion source. Correspondingly, sulfate nanoparticles can be produced from starting materials such as tetrabutylammonium hydrogensulfate, tetramethylammonium hydrogensulfate, bis-tetrabutylammonium sulfate, or triethylammonium hydrogensulfate. For the preparation of nanoparticles with fluorine-containing anions, triethylaminetrishydrofluoride, tetrabutyl ammonium fluoride, tetrabutyl ammonium hydrogendifluoride, dodecylamine hydrofluoride or the less soluble pyridine hydrofluoride, or collidine hydrofluoride can be used.

If the metal ion (cation source) dissolves too slowly in the organic medium, it is preferred to dissolve the same in a lower alcohol, preferably methanol, prior to the addition of the metal-complexing agent and reaction solvent. Methanol and water of crystallization are then removed by distillation and drying, before further reactants are added.

According to the claimed process, nanoparticles obtainable according to one of the above synthesis techniques are provided as dispersion in an organic medium (so-called "first mixture").

The organic medium is preferably based on one or more polar solvents having a boiling point of more than 120° C., in particular more than 180° C., but less than 400° C. It is preferably selected from "metal-complexing agents", in particular said mono- or dialkyl amines wherein the alkyl residues have from 4 to 20 C atoms, phosphororganic compounds, polyols and sulfoxides. Preferably, the organic medium contains the metal-complexing agent and optionally "at least one further solvent" described in the context of the organic synthesis.

Correspondingly, it is possible and preferred to employ nanoparticles produced in an "organic" synthesis or "polyol or sulfoxide" in the first step of the claimed process without isolating the same.

It should be noted that the organic medium serves as a dispersion medium for the nanoparticle cores. Thus, due to the ability of the organic medium to coordinate to the metal atom, the nanoparticles are maintained in their colloidal (non-dissolved) state before a shell can be grown thereon.

II.2. Second Process Step

In the second step the
above-described first mixture,
an anion source for the shell to be formed, in particular a phosphate, sulfate or fluoride source, and
a so called "second mixture" comprising shell-forming metal ions (and their counterion) and an organic complexing agent for said metal ions are reacted at a temperature of 50 to 350° C. until a shell has formed around said luminescent nanoparticles.

Generally, it is preferred to keep anion source and first mixture separate in order to avoid a premature reaction.

The second process step can be conducted according to the following three embodiments (A), (B) and (C):

Process (A) comprises the steps of
preparing a first mixture comprising optionally doped, luminescent metal sulfate, phosphate or fluoride nanoparticles in an organic medium,
heating said first mixture to a temperature of 50 to 350° C.,
adding to this first mixture at this temperature, dropwise and separately, an anion source for the shell to be formed and a second mixture comprising shell-forming metal ions and an organic complexing agent for said metal ions, and reacting the resulting mixture at this temperature until a shell has formed around said luminescent nanoparticles.

The separate, but simultaneous addition of anion source and second mixture, for instance by means of two dropping tunnels reduces the concentration of active starting materials for the shell and thus increases the selectivity of the reaction by decreasing independent particle growth from the starting materials for the shell.

Process (B) comprises the steps of preparing a first mixture comprising optionally doped, luminescent metal sulfate, phosphate or fluoride nanoparticles in an organic medium, adding a shell-forming anion source to said first mixture heating the resulting mixture to a temperature of 50 to 350° C., adding dropwise thereto a second mixture comprising shell-forming metal ions and an organic complexing agent for said metal ions, and reacting the resulting mixture at this temperature until a shell has formed around said luminescent nanoparticles.

Process (A) and (B) tend to form more uniform particles, which further contain a smaller percentage of independently grown particles of shell-forming materials.

Process (C) comprises the steps of preparing a first mixture comprising optionally doped, luminescent metal sulfate, phosphate or fluoride nanoparticles in an organic medium, combining said first mixture, an anion source for the shell to be formed and a second mixture comprising shell-forming metal ions and an organic complexing agent for said metal ions, preferably by adding said first mixture and said anion source to said second mixture, and heating the resulting mixture to a temperature of 50 to 350° C. until a shell has formed around said luminescent nanoparticles.

Surprisingly, it was found that a gradual addition, e.g. dropwise, of starting materials is not absolutely required. Although, according to process (C), the starting materials can be combined by mixing the complete portions, the desired core/shell material is formed with high selectivity and little independent particle growth. Process (C) thus is more easily handled than processes (A) and (B).

If not stated otherwise, the following preferred embodiments apply to all three processes (A), (B) and (C).

As metal ion source any sufficiently reactive metal salt can be used, preferably chlorides or alkoxides of the shell metal ion. The alkoxide group preferably has from 1 to 4 carbon atoms.

Any suitable anion source can be used as long as it is capable of forming a shell around the core particles provided in the first step.

Suitable anions forming the shell involve, but are not limited to phosphates, halophosphates, arsenates, sulfates, borates, aluminates, gallates, silikates, germanates, oxides, vanadates, niobates, tantalates, tungstates, molybdates, alkalihalogenates, other halides, nitrides, sulfides, selenides, sulfoselenides oder oxysulfides.

It is preferred to use for the shell formation anions which suitably react in organic media under similar or identical conditions as described in PCT/DE 01/03433. Examples involve silicates, borates, arsenates, sulfides, sulfates, phosphates, and fluorides, in particular sulfates, phosphates and fluorides. This document also teaches which anion sources can be used for generating the corresponding nanoparticulate material.

As to a suitable phosphate, sulfate or fluoride source, reference is also made to anion sources described above for the first step of the claimed process, in particular those employed in the "polyol or sulfoxide" and/or "organic" synthesis.

The anion source is preferably added as fine dispersion or solution in at least one of the solvents described for the "polyol or sulfoxide" or "organic" synthesis.

The anion source, in particular phosphate, fluoride or sulfate source is preferably used in amounts of 0.75 to 3 mol, in particular 0.75 to 2, based on the stoichiometrically required molar amount for reacting with all shell-forming metal atoms added. With binary salts (AB) the ratio B (anion) to A (metal) thus ranges thus from 0.75:1 to 2:1.

Phosphate and Fluoride sources, such as phosphoric acid or HF are preferably employed in excess amounts in the "organic" synthesis of core or core/shell particles made from phosphate or fluoride. The excess molar amount is preferably at least 1.05 mol, more preferably 1.1 to 2 mol, in particular 1.2 to 1.6 mol based on the stoichiometrically required molar amount.

It is similarly preferred to use sulfate sources, such as quaternary ammonium (hydrogene)sulfate salts in excess amounts in the "polyol or sulfoxide" synthesis of sulfate core or core/shell particles. The excess molar amount is preferably at least 1.05 mol, more preferably 1.1 to 3 mol, in particular 1.2 to 2 mol based on the stoichiometrically required molar amount.

The organic complexing agent contained in the second mixture may also be selected from the organic complexing agents explained above in the context of the organic synthesis of nanoparticles or the solvents described for the "polyol or sulfoxide synthesis".

Generally, it is desirable to keep the effective concentration of the shell-forming ions as low as possible. In accordance with the present invention, this is achieved by the use of a metal complexing agent. Without being bound to theory, it is believed that only a small concentration of reactive (uncomplexed) metal ions favors shell growth vis-à-vis the independent formation of new particles.

According to a preferred embodiment, the organic medium used for the first mixture and the complexing agent being present in the second mixture represent the same polar organic compound, for instance, one of the phosphororganic compounds, mono/di-substituted amines, polyols or sulfoxides mentioned before.

Further, it is also preferred to use the aforementioned "at least one further solvent" in the same ratio to the organic complexing agent. This allows using lower amounts of metal complexing agent as if it constitutes the only solvent. Then the molar ratio of metal complexing agent and shell-forming metal ions is again preferably 0.9:1 to 6:1.

If the anion source for the shell material possesses acid hydrogen atoms, it is preferred to use the above-described bases. The above-described organic high-boiling base (e.g. trialkylamine) is for instance preferably used as acid scavenger for anion sources like phosphoric acid or HF under the conditions described. According to process (A) or (B), the base is preferably added as ingredient of the "second mixture" comprising the metal source and complexing agent.

The total amount of solvent(s), including the metal complexing agent can be easily determined by a skilled person, since it is generally preferred to dissolve or disperse all starting materials homogenously. In process (A) and (B) it is preferred to use approximately the same amounts of solvents for dissolving the anion source and the metal source (second mixture).

Generally speaking, the reaction can proceed under the same or similar conditions as discussed before under Item II.1 for the "polyol or sulfoxide" or "organic" synthesis, if not stated otherwise. This also applies to the use of protecting inert gas and the drying of the reactants.

The amount of nanoparticle cores to be combined with the remaining starting materials is not specifically limited and primarily depends from the targeted shell thickness.

According to the process of the present invention, the reaction medium is heated to a temperature of from 50 to 350° C., in particular 120° to 320° C. until a shell has formed around the luminescent nanoparticle cores prepared in the first process step.

The reaction is preferably conducted at a temperature of from 160° to 240° C., in particular 180° to 220° C. for the fluorides and phosphates, and 160° to 180° C. for the sulfates. The formation of sulfate shells in glycerol may also allow much lower temperatures (e.g., 50 to 100° C.). A suitable temperature can be easily determined by a skilled person by monitoring the shell growth at gradually increasing temperatures, thereby determining the synthesis minimum temperature at which the reaction proceeds with sufficient speed, but without undesired side reactions, like the development of new particles from the starting materials employed for the shell.

In those processes (A and B) where starting materials are added dropwise, the addition time ranges preferably from 0.5 to 10 hours, in particular 1 to 5 hours.

Preferred reaction times range from 30 min to 48 hours, in particular from 1 hour to 20 hours, specifically from 1.5 to 16 hours. Again, monitoring the reaction, for instance by precipitating the nanoparticles from samples taken from the reaction medium and studying the particle size distribution in TEM micrographs, allows determining a suitable reaction time. The reaction must be terminated, for instance by cooling, as soon as Oswald ripening is observed, i.e. when the bigger particles start to grow at the expense of the smaller particles.

After completion of the reaction, the reaction medium is cooled down to room temperature. This already enhances the precipitation of the core/shell nanoparticles formed. If the precipitation is incomplete, the addition of precipitating solvents (e.g. methanol) to the reaction medium or vice versa allows a complete recovery of the reaction product. Alternatively, it is possible to distill off the excess of organic solvents, including the organic complexing agent or conduct an ultra-filtration through membranes with a preferred pore size corresponding to Dalton values in the order of 5000 to 10000. These values correspond to a cut-off of about 3 nm which is in many cases great enough to allow the solvent passing and small enough to prevent the penetration and loss of nanoparticles. Typically, a pressure of 2 to 5 bar is necessary for exchanging the solvents in the corresponding ultra-filtration cells.

Further, it is preferred to wash the nanoparticles obtained, for instance with methanol, ethanol or isopropanol.

In the manners indicated below, it can be confirmed that shell growth actually has taken place.

One option involves the continuous monitoring of the reaction by precipitating small samples and analysing their particle size distribution, for instance in TEM micrographs. The samples drawn in this manner will show whether shell growth has occurred over the entire reaction time or the independent formation of smaller particles can also be observed. EDX analysis (energy-dispersive X-ray analysis) can prove the total composition of the nanoparticles. XPS spectroscopy may furnish additional information regarding the distribution of the composition from the outer to the inner portions of the particles, if the XPS is performed at different excitation energies. Moreover, the quantum yields of core/shell particles can be easily distinguished from the core nanoparticles employed in the reaction.

If a shell of non-luminescent material has grown around a optionally doped, luminescent nanoparticle core, the quantum yield of the latter will increase. This can be derived from FIG. 1 which shows the fluorescence spectra of homogeneous $CePO_4$:Tb nanoparticles (drawn-through line) and core/shell particles according to the present invention (dotted line) wherein a $LaPO_4$ shell was grown around $CePO_4$:Tb cores. Both spectra were measured at the same optical density ($10^{-3}$ wt-%) in i-propanol ($\lambda_{exc}$=274 nm).

Figure 1:
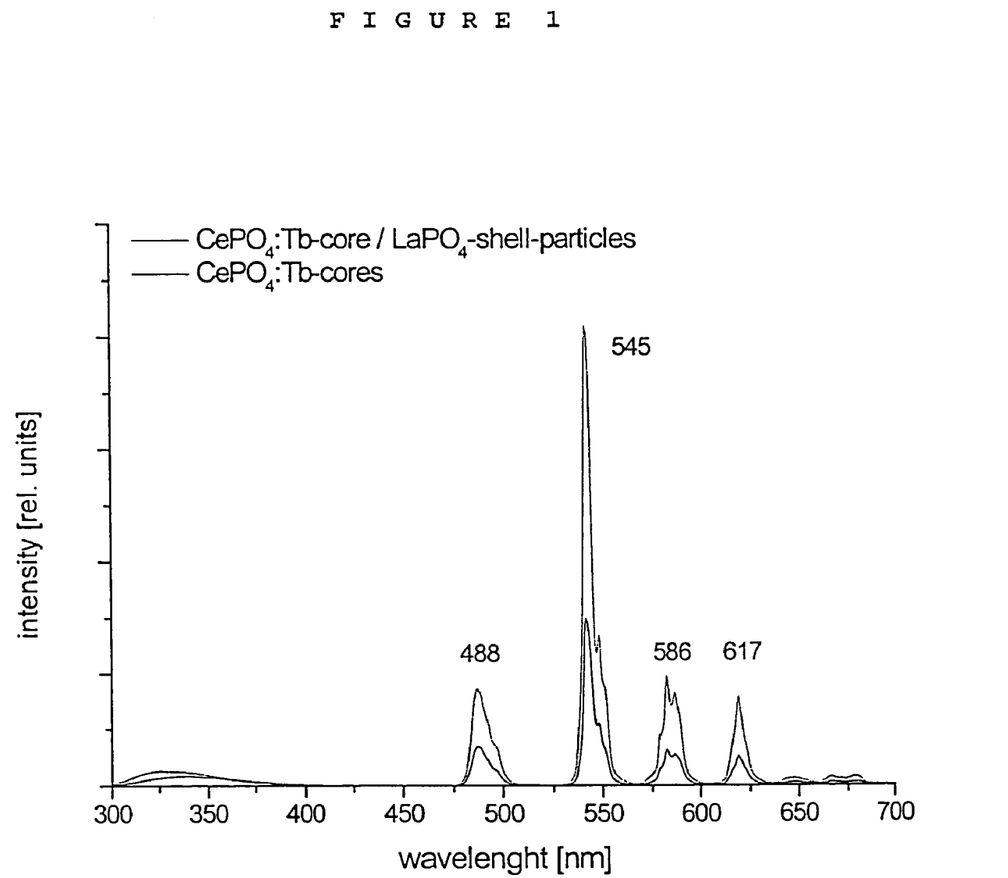
FIG. 1 shows the fluorescence spectra of homogeneous $CePO_4$:Tb nanoparticles (drawn-through line) and core/shell particles according to the present invention (dotted line) wherein a $LaPO_4$ shell was grown around $CePO_4$:Tb cores.

From FIG. 1 it is seen that the fluorescence intensity of $CePO_4$:Tb cores was increased considerably by coating with a $LaPO_4$ shell.

III. Use of Core/Shell Particles

The claimed core/shell particles can be used for various industrial devices and products where photoluminescence is of interest.

For this purpose they are typically prepared as dispersion in fluid or solid media.

Suitable fluid media comprise for instance an organic or aqueous dispersion medium, a coating composition, an ink or dye, a polymer composition, or an aerosol. Suitable organic dispersion media involve, but are not limited to toluene, xylene, $CHCl_3$ or $CH_2Cl_2$.

The synthesis with N- or P-containing media/complexing agents, as described above, ensures the ready dispersibility of the core/shell particles according to the present invention in organic media.

The preparation of an aqueous dispersion may require an after-treatment where residues of organic materials used in the synthesis are replaced by solvents having one functionality binding to the surface of the particles and one hydrophilic molecule portion ensuring the necessary compatibility in water, optionally in combination with water-miscible solvents.

The solid dispersion medium may be selected from a coating, ink or dye, a polymer composition, in particular a polymer film.

The nanoparticles as such, or typically a fluid or solid medium containing the same, can for instance be used for light generation, printing or marking items and materials.

Such applications comprise for instance light-emitting diodes, displays, optoelectronic devices, e.g., amplifiers with nm dimensions and light sources in zero-threshold lasers. They can also be used as ink in printing devices which is of great interest in security marking of documents or money bills.

IV. EXAMPLES

Example 1

$CePO_4$:Tb Nanoparticle Cores Having a $LaPO_4$ Shell

In a 100 ml round-bottom flask provided with a high performance reflux condenser, temperature probe and a heating mantle, 2.79 g (7.5 mmol) $CeCl_3 \times 7H_2O$ and 0.934 g (2.5 mmol) $TbCl_3 \times 6H_2O$ were dissolved in about 10 ml methanol, followed by adding 10.9 ml (40 mmol) tributylphosphat to the solution. As the next step, methanol is removed under vacuum at a temperature of 20° to 30° C. Then, 30 ml diphenyl ether is added and the remaining volatile ingredients, primarily crystallization water, are distilled off under vacuum at 80° C.

In a second flask, dry ortho-phosphoric acid (20 mmol) is dissolved in 10 ml tetraethyleneglycol dimethylether.

10.2 ml (30 mmol) trihexylamine and 7.0 ml (14 mmol phosphoric acid) of ortho-phosphoric acid/tetraethyleneglycol dimethylether solution are added to the above $CeCl_3$/$TbCl_3$ solution, followed by heating to 200° C. over 24 hours under reflux. After this period of time, a clear dispersion ("first mixture") of $CePO_4$:Tb nanoparticles is obtained.

In a second 100 ml round-bottom flask provided with a high performance reflux condenser, a temperature probe and a heating mantle, 3.71 g $LaCl_3 \times 7H_2O$ (10 mmol) are dissolved in about 10 ml methanol, followed by adding 10.9 ml tributylphosphate (40 mmol) to the resulting solution. As the next step, methanol is removed at room temperature under vacuum. Then 30 ml diphenylether is added to the resulting solution and the remaining volatile components, primarily crystallization water are removed at about 80° C. under vacuum to obtain the so-called "second mixture".

13.1 ml (30 mmol) trihexylamine, 7 ml (14 mmol phosphoric acid) ortho-phosporic acid/tetraethyleneglycol dimethylether solution and 14.5 ml $CePO_4$:Tb dispersion (cooled down to 20-30° C.) are added to the above $LaCl_3$ solution ("second mixture") which is then heated to 200° C. over 16 hours.

In order to work up the reaction mixture, firstly diphenylether is distilled off under vacuum at 80° to 150° C., followed by adding about 200 ml ethanol to the residue in order precipitate the nanoparticles. The precipitate is centrifuged (5500 upm), washed with methanol and dried.

The core/shell particles obtained have an average diameter along their longest axis of about 7 nm as determined by TEM micrographs.

Its photoluminescence spectrum is shown in FIG. 1. The particles show a very intense green luminescence. From the spectral data, a quantum yield of 70% was calculated.

In addition, the following spectroscopic analysis was carried out with the core/shell particles obtained. For this purpose the particles were mounted on carbon film provided with holes and studied under a Philipps CM300UT microscope.
a) EELS (Electron Energy Loss Spectroscopy) showed that the average chemical composition of the cations was Ce/La=0.34±0.05, Tb/La=0.12±0.03 which means that La/Ce=3.0±0.4 and Ce/Tb=2.8±0.8, the latter value corresponding approximately to the molar ratio Ce/Tb (3.14/1) used.
b) HREM (High Resolution Electron microscopy) confirmed the crystallinity of the core/shell particles obtained.
c) Moreover, a Hellfeld image was taken with a slight underfocus at a scanning rate of 0.48 nm/image point in order to cover also smaller particles. The analysis of this image showed that the major particle class in terms of volume showed diameters from 5 to 9 nm. Six of this particles were subjected to EFTEM (Energy-filtering Transmission Electron Microscopy), specifically the so-called "spectrum image method" which was developed by the "Landeszentrum für Hochleistungsspektroskopie, Institut für Anorganische Chemie" in Bonn, Germany for quantitative analysis. For this purpose six crystalline particles were centered at very high magnification on the CCD camera behind the imaging energy filter. Then the smallest objective screen (4.6 mrad) and biggest entrance screen (3 mm) were inserted and the energy filter was used in its spectroscopy mode. Thereby the complete intensity passing the entrance screen is imaged line by line on the detector. Due to the chromatic aberration of the lense this process images only a section of about ±40 eV with high sharpness (below nm) so that it was focused on the $La_{M5,4}$ and $Ce_{M5,4}$ edges at 832, 849, 884 and 902 eV. At the selected primary magnification of 99K the diameter of the entrance screen was always 11.2 nm.

Figure 2:
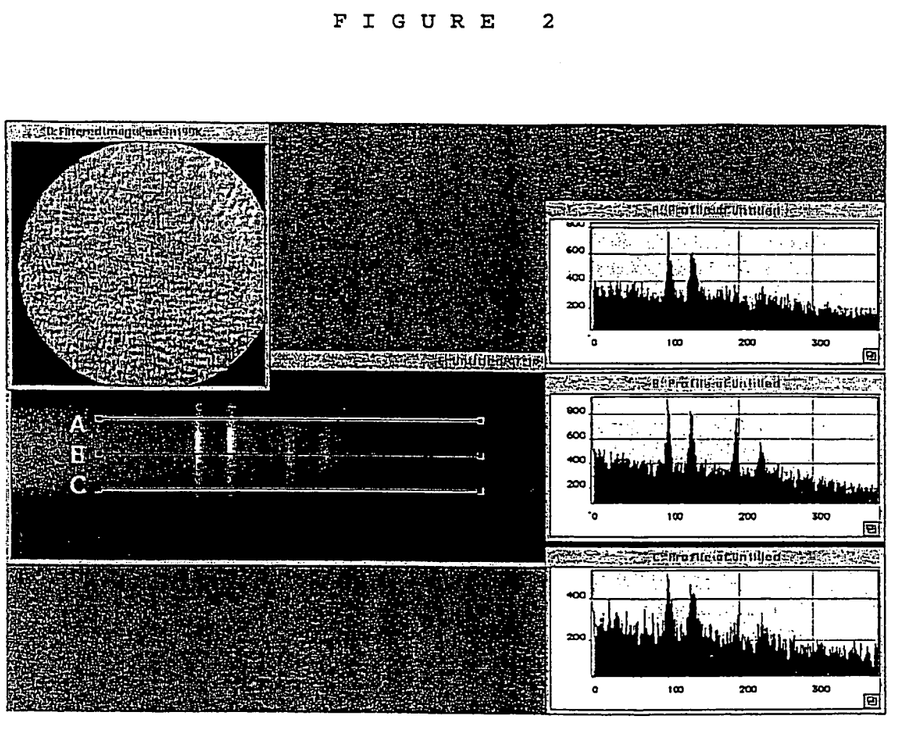
FIG. 2 shows TEM (transmission electron microscope) analysis results of one core/shell particle according to the invention, specifically (D) the Hellfeld image of one $CePO_4$:Tb nanoparticle surrounded by a $LaPO_4$ shell (diameter about 7 nm), (E) the spectrum image at 860 eV energy loss as well as profiles through the particle surface (A, C) and the center (B).

FIG. 2 shows (D) the Hellfeld image (with entrance screen) of one $CePO_4$:Tb nanoparticle surrounded by a $LaPO_4$ shell (diameter about 7 nm), (E) the spectrum image at 860 eV energy loss as well as profiles through the particle surface (A, C) and the center (B). The profiles (A, B and C) show the $La_{M5,4}$ and $Ce_{M5,4}$-peaks the relative intensity of which approximately corresponds to the local composition.

The different profiles confirm the existing core/shell structure of a core rich in Ce and a shell rich in La. The six selected particles had on average a diameter of 7.5±1.9 nm composed of a Ce-rich core having a diameter of 4.0±1.1 nm and a La-rich shell having a thickness of 1.9±0.7 nm (Tb was not determined in this analysis).

Example 2

$BaSO_4$:Eu(II) Nanoparticle Cores Having a $BaSO_4$ Shell.

In a 50 ml round-bottom flask provided with a high performance reflux condenser, a temperature probe and a heating mantle 540 mg (2.2 mmol) $BaCl_2 \times 2H_2O$ are dissolved in a methanol/water mixture (5 ml, 50/50 v/v). Then 10 ml DMSO and 545 mg imidazol (8 mmol) are added. After applying vacuum to this round-bottom flask, methanol and water are firstly removed at room temperature (1 to 2 hours) and then at 35° C. (2 hours).

In a further flask, 1.32 g (3.9 mmol) tetrabutylammonium hydrogensulfate is dissolved in 10 ml DMSO.

0.401 g (1.8 mmol) $EuCl_2$ is added to the above $BaCl_2$ solution, followed by the addition of the aforementioned tetrabutylammonium hydrogensulfate solution in DMSO. The reaction mixture is heated to 170° C. over 30 minutes which leads to a clear dispersion ("first mixture") of $BaSO_4$:Eu(II) nanoparticle cores.

In a second 100 ml round-bottom flask provided with a high performance reflux condenser, a temperature probe and a heating mantle, 977 mg (4 mmol) $BaCl_2 \times 2H_2O$ are dissolved in a methanol/water mixture (8 ml, 50/50/v/v), followed by the addition of 10 ml dimethylsulfoxide (DMSO) and 545 ml (8 mmol) imidazol. After applying vacuum to the round-bottom flask, methanol and water are firstly removed at room temperature (1 to 2 hours) and then at 35° C. (2 hours). Under a nitrogen atmosphere and with stirring, the cooled-down $BaSO_4$:Eu dispersion and a solution of tetrabutylammonium hydrogensulfate (2.64 g, 7.8 mmol) in 10 ml DMSO are added to the resulting $BaCl_2$ solution ("second mixture"), followed by heating the reaction mixture 1 hour over 170° C. After cooling to room temperature, the reaction mixture is poured into methanol. The resulting precipitate is centrifuged (at 5500 upm), washed with methanol and dried.

Example 3

$NdPO_4$ Nanoparticle Cores Having a $GdPO_4$ Shell

In a 100 ml round-bottom flask provided with a high performance reflux condenser, a temperature probe and heating mantel, 3.0 g (8.4 mmol) $NdCl_3 \times 7H_2O$ are dissolved in about 6 ml methanol followed by adding 37 ml tris-2-ethylhexylphosphat (TEHP) to the resulting solution. A vacuum is applied to the round-bottom flask in order to remove methanol and crystallization water, firstly at room temperature (1 to 2 hours) and then at 50° C. (several hours).

In a second flask, dry ortho-phosphoric acid (20 mmol) is dissolved in 5 ml tetraethyleneglycol dimethylether.

Under a nitrogen atmosphere and at 50° C., 12.0 ml (27.4 mmol) trioctylamine and 2.1 ml ortho-phosphoric acid/tetraethyleneglycol dimethylether mixture are added to the $NdCl_3$ solution in TEHP. Thereafter the mixture is heated 16 hours to 200° C. After this period of time, a clear dispersion ("first mixture") of $NdPO_4$ particles is obtained.

In a second 100 ml round-bottom flask provided with a high performance reflux condenser, a temperature probe and a heating mantel, 1.45 g (6.6, mmol) $GdCl_3 \times 6 H_2O$ are dissolved in about 10 ml methanol followed by adding 17.6 ml tris-2-ethylhexylphosphat (TEHP) to the solution. After applying vacuum to this round-bottom flask, methanol and crystallization water are firstly removed at room temperature (1 to 2 hours) and then at 50° C. (several hours). Under a nitrogen atmosphere and at 50° C., 5.3 ml (12.1 mmol) trioctylamine and 0.99 ml (3.96 mmol phosphoric acid) orthophosphoric acid/tetraethyleneglycol dimethylether solution as well as the entire amount of the $NdPO_4$ dispersion (cooled down to about 20-30 ° C.) are added to the $GdCl_3$ solution ("second mixture"), followed by heating to 200° C. over 16 hours. After cooling to room temperature, the reaction mixture is poured into methanol (300 ml) in order to precipitate the core/shell nanoparticles. The precipitate is centrifuged (at 5500 upm) and the resulting particles are washed twice with methanol and dried.

Example 4

$CePO_4$:Nd nanoparticle cores having a $LaPO_4$ shell.

Firstly, an approximately 2M solution of phosphoric acid in dihexylether is produced from about 9.80 g dry phosphoric acid and 40 ml dihexylether in a 100 ml round bottom flask and then filled up to 50 ml in a volumetric flask. If moisture-containing $H_3PO_4$ (about 10 to 11 g) is used, the moisture has to be removed with a rotary evaporator.

Parent Solution for Cores:

3.61 g $CeCl_3 \times 7H_2O$ (9.7 mmol) and 0.108 g $NdCl_3 \times 6H_2O$ (0.3 mmol) are dissolved in about 10 ml methanol p.a. in a 100 ml three-neck flask, 10.98 ml (40 mmol) tributylphospate is added thereto and the methanol distilled off with a rotary evaporator (at maximally 40° C. and 50 mbar). With an oil pump the crystal water is distilled off at 50° C. and the temperature finally increased to 80° C. After cooling down the mixture to 50° C., 30 ml diphenylether is added, and water is newly distilled off with an oil pump (until bubbles no longer form).

10.87 ml of this solution (corresponding to 2.5 mmol metal atoms) are transferred into a 250 ml four-neck flask (having a condenser and dropping funnel).

Parent Solution for Shell:

5.57 g $LaCl_3 \times 7H_2O$ (15 mmol) is dissolved in approximately 15 ml methanol p.a. in a 100 ml three-neck flask, 16.36 ml (60 mmol) tributylphosphate is added thereto and the methanol is distilled off with a rotary evaporator (at maximally 40° C. and 50 mbar). With an oil pump the crystal water is distilled off at 50° C. and the temperature finally increased to 80° C. After cooling down to 50° C., 45 ml diphenylether is added thereto and water newly distilled off with an oil pump until bubbles no longer form.

The dropping funnel connected to the four-neck flask is charged with 35.52 ml of this parent solution.

Synthesis of Core Particles:

At 50° C. 2.54 ml (7.5 mmol) trihexylamine and an amount of the above prepared phosphoric acid solution that corresponds to 3.5 mmol phosphoric acid are added to the solution in the four-neck flask and this solution is newly evacuated, aerated with nitrogen and heated to 200° C. for at least one hour (up to 16 hours).

Synthesis of Shell:

An amount of phosphoric acid solution that corresponds to 9.5 mmmol phosphoric acid is now added to the solution in the four-neck flask. The $LaCl_3$-containing solution in the dropping funnel is added dropwise over 1.5 to 2 hours to the 200° C. warm solution followed by stirring the mixture at 200° C. over 16 hours.

Work Up:

After cooling down the reaction mixture to less than 50° C., the solution obtained is diluted with methanol to precipitate the synthesized core/shell particles which then can be further purified by multiple ultra-filtration in a stirring cell (5000 D membrane) using methanol.

The invention claimed is:

1. Luminescent nanoparticles comprising:
   (a) a core comprising a luminescent metal salt selected from phosphates, sulfates or fluorides; and
   (b) a shell surrounding the core, wherein the shell comprises a metal salt capable of preventing or reducing energy transfer from the core to the surface of the nanoparticle, after electronic excitation of the core, and
   wherein
   (i) said metal salt comprised by the shell is non-luminescent, or
   (ii) the respective energetic distances between the electronic ground state and the first excited state of said luminescent metal salt comprised by the core and said metal salt comprised by the shell do not allow the transfer of the excitation energy from the excited core to the shell.

2. Luminescent nanoparticles according to claim 1, wherein the luminescent metal salt of the core and the metal salt of the shell are both selected from phosphates, sulfates or fluorides.

3. Luminescent nanoparticles according to claim 1 having an average diameter based on their longest axis of less than 30 nm.

4. Luminescent nanoparticles according to claim 1, wherein the average thickness of the shell does not exceed the average diameter of the core.

5. Luminescent nanoparticles according to claim 1 wherein the core comprises a doped luminescent metal sulfate, phosphate or fluoride and the shell consists of a non-luminescent metal salt.

6. Luminescent nanoparticles according to claim 5, wherein the core comprises a doped host metal sulfate, phosphate or fluoride, wherein the host metal is selected from alkaline earth metals, Sc, Y, La, Al, Ga, In, Ti, or Zn, and the dopant is at least one lanthanide metal selected from Ce, Pr, Nd, Sm, Eu, Gd, Tb, Dy, Ho, Er, Tm, or Yb, or a transition metal selected from Cr and Mn.

7. Luminescent nanoparticles according to claim 5, wherein the core comprises a doped host metal sulfate, phosphate or fluoride, wherein the host metal and the dopant are selected from Ce, Pr, Nd, Sm, Eu, Gd, Tb, Dy, Ho, Er, Tm, or Yb.

8. Luminescent nanoparticles according to claim 7 wherein the core consists of $CePO_4$:Tb or $CePO_4$:Nd and the shell of $LaPO_4$.

9. Luminescent nanoparticles according to claim 1 wherein the core consists of a luminescent lanthanide sulfate, phosphate or fluoride and the shell consists of a lanthanide salt different from the core material and preventing or reducing energy transfer from the core to the surface of the nanoparticle, after electronic excitation of the core.

10. Luminescent nanoparticles according to claim 9 wherein the core consists of a Nd sulfate, phosphate or fluoride, and the shell consists of a Gd salt.

11. A dispersion comprising a fluid or solid medium and the nanoparticles according to claim 1.

12. The dispersion according to claim 11, wherein the fluid medium is selected from an organic or aqueous dispersion medium, a coating composition, ink, dye, polymer composition, or aerosol.

13. The dispersion according to claim 11, wherein the solid medium is selected from a coating, ink, dye, or a polymer composition.

14. The dispersion according to claim 13, wherein the solid medium is a polymer composition.

15. The dispersion according to claim 14, wherein the polymer composition is a polymer film.

16. A process for the preparation of luminescent nanoparticles comprising:
    preparing a first mixture comprising luminescent metal sulfate, phosphate or fluoride nanoparticle cores in an organic medium; and
    reacting said first mixture, an anion source for the shell to be formed and a second mixture comprising shell-forming metal ions and an organic complexing agent for said metal ions at a temperature of 50 to 350° C. until a shell has formed round said luminescent nanoparticle cores.

17. The process according to claim 16, wherein said reacting comprises:
    heating said first mixture to a temperature of 50 to 350° C., and
    adding to this first mixture at this temperature, dropwise and separately, an anion source for the shell to be formed and a second mixture comprising shell-forming metal ions and an organic complexing agent for said metal ions, until a shell has formed around said luminescent nanoparticle cores.

18. The process according to claim 16, wherein said reacting comprises:
    adding an anion source to said first mixture
    heating the resulting mixture to a temperature of 50 to 350° C.,
    adding thereto a second mixture comprising shell-forming metal ions and an organic complexing agent for said metal ions at this temperature until a shell has formed around said luminescent nanoparticle cores.

19. The process according to claim 16, wherein said reacting comprises:
    combining said first mixture, an anion source for the shell to be formed and a second mixture comprising shell-forming metal ions and an organic complexing agent for said metal ions, and
    heating the resulting mixture to a temperature of 50 to 350° C. until a shell has formed around said luminescent nanoparticle cores.

20. The process according to claim 16, wherein the organic medium present in the first mixture and the organic complexing agent present in the second mixture are identical.

21. The process according to claim 16, wherein the organic medium and the complexing agent are selected from mono-or dialkyl amines wherein the alkyl residues have from 4 to 20 carbon atoms, phosphororganic compounds, polyols and sulfoxides.

22. The process according to claim 16, comprising the steps of synthesizing the nanoparticle cores in said organic medium followed by reacting these cores without prior isolation.

23. The process according to claim 16, wherein the anion source is used in excess molar amounts based on the stoichometrically required amount for reacting with available shell-forming metal atoms.

24. The process according to claim 23, wherein the anion source is phosphate, sulfate or fluoride.

25. The process according to claim 16, wherein said luminescent metal sulfate, phosphate, or fluoride nanoparticle cores are doped.

* * * * *